United States Patent
Patel et al.

(10) Patent No.: US 7,039,138 B2
(45) Date of Patent: May 2, 2006

(54) METHOD AND APPARATUS FOR BANDWIDTH ESTIMATION

(75) Inventors: Shimman Patel, San Diego, CA (US); Thomas B. Wilborn, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 763 days.

(21) Appl. No.: 09/898,537

(22) Filed: Jul. 2, 2001

(65) Prior Publication Data

US 2002/0186788 A1 Dec. 12, 2002

Related U.S. Application Data

(60) Provisional application No. 60/296,028, filed on Jun. 5, 2001.

(51) Int. Cl.
*H04B 1/10* (2006.01)
*H04B 1/707* (2006.01)

(52) U.S. Cl. ........................ 375/350; 375/147
(58) Field of Classification Search ................ 375/224, 375/340

See application file for complete search history.

(56) References Cited

U.S. PATENT DOCUMENTS

| 5,640,431 A | 6/1997 | Bruckert et al. |
| 6,032,166 A * | 2/2000 | Signell et al. ................. 708/3 |
| 6,418,162 B1 * | 7/2002 | Yau et al. .................... 375/224 |

FOREIGN PATENT DOCUMENTS

| EP | 0898379 | 5/1998 |
| WO | 0057568 | 9/2000 |

OTHER PUBLICATIONS

R.B. Randall, et al., "Frequency Analysis" (1977) XP002211051.

* cited by examiner

*Primary Examiner*—Kevin Kim
(74) *Attorney, Agent, or Firm*—Philip R. Wadsworth; Charles D. Brown; George C. Poppas

(57) ABSTRACT

A computationally efficient method and apparatus for estimating the bandwidth of a received signal. In an exemplary implementation, signal power within several selectably narrow frequency bands, each centered about a selected frequency, are calculated using only a relatively small number of arithmetic operations. Applications include using the estimated bandwidth to estimate the relative velocity between the transmitter and receiver, and modifying receiver operation based on such estimate.

30 Claims, 13 Drawing Sheets

US 7,039,138 B2

METHOD AND APPARATUS FOR BANDWIDTH ESTIMATION

RELATED APPLICATIONS

The present application claims priority to U.S. Provisional Application No. 60/296,028 filed Jun. 5, 2001.

BACKGROUND OF THE INVENTION

1. Field of the Invention

The present invention relates to wireless communications. More specifically, the present invention relates to signal reception.

2. Background Information

A system for mobile wireless communications may support communications between a base station and a mobile unit even when the mobile unit is in motion. For example, a system for cellular telephony may support communications even when the mobile unit is moving at a high rate of speed, such as in an automobile or on a train.

Relative movement between a mobile unit and a base station in communication may affect the characteristics of the transmission channel between them, however. Specifically, this relative movement may give rise to a Doppler frequency shift that results in a spreading of the transmitted signal at the receiver. The Doppler effect may be illustrated graphically by comparing spectral plots of a transmitted signal at the transmitter and at the receiver. For example, a pilot signal of a code-division multiple-access (CDMA) system (before pseudonoise (PN) spreading and transmission by a base station) may have a delta-function magnitude spectrum as shown in FIG. 1A. As a result of the Doppler effect, the spectrum of the signal as received (and after PN despreading) by a mobile unit in motion may be spread as shown in the magnitude spectrum of FIG. 1B. The bandwidth of the spreading is a function of the carrier frequency and of the relative velocity, as described by the following expression:

$$f_d = f_c \frac{v}{c} \quad (1)$$

where $f_d$ is the Doppler frequency, $f_c$ is the carrier frequency, c is the speed of light, and v is the relative velocity. Expression (1) demonstrates that the bandwidth of the Doppler spreading is dependent on (and increases with) the relative velocity. In a system for mobile wireless communications, the perceived relative velocity may be expected to change constantly. Additional discussion of the Doppler effect in wireless communications may be found in *Microwave Mobile Communications*, W. C. Takes, ed., 1974 (reprinted 1994 by IEEE Press, Piscataway, N.J.) and *Wireless Communications*, T. S. Rappaport, Prentice-Hall, 1996.

Bandwidth spreading as caused by the Doppler effect may create inaccuracies in a signal as received. Information relating to Doppler spreading of a signal may be applied within a receiver to improve reception of the spread signal (and possibly of other signals received over the same path). Unfortunately, existing methods for bandwidth estimation are too inefficient for practical application. What is needed is a method and apparatus to efficiently obtain a bandwidth estimate.

SUMMARY

A method according to an embodiment of the invention includes generating filter coefficients from a generating value, obtaining a power measure of a received signal with respect to a selected frequency, and estimating a bandwidth of the received signal based on the power measure. In obtaining the power measure, a method includes multiplying samples of the received signal with the filter coefficients. In related embodiments, generating filter coefficients includes rotating a filter coefficient by the generating value. A method according to another embodiment of the invention includes obtaining power measures of a received signal, each corresponding to a selected frequency, and estimating a bandwidth of the received signal based on the power measures.

A method according to another embodiment of the invention includes nonuniformly sampling a frequency spectrum of a received signal, determining power measures of the received signal at the sampling frequencies, and obtaining an estimate of the bandwidth of the signal based on the power measures. In related embodiments, nonuniformly sampling the frequency spectrum includes filtering the received signal with filters centered at the selected sampling frequencies.

A filter according to an embodiment of the invention includes a lookup table to store generating values, a first multiplier to receive a generating value and a current filter coefficient and to output a subsequent filter coefficient, an accumulator to store the subsequent filter coefficient, a second multiplier to multiply the current filter coefficient with a sample of a received signal and to output a current filtered value, and an adder to receive the current and past filtered values and to output an accumulation signal. In related embodiments, a filter includes a power calculator to output a power measure based on a value of the accumulation signal.

A system according to an embodiment of the invention includes a lookup table to store generating values, filters to output power measures, and a bandwidth estimator to output an estimate of the bandwidth of a received signal. In related embodiments, the bandwidth estimator compares a relation between two or more power measures to a predetermined threshold and/or modifies one or more power measures based on a power measure corresponding to a frequency outside an expected bandwidth of the received signal.

DETAILED DESCRIPTION

In situations where Doppler spreading may occur, a receiver may achieve better performance if it is configured to account for the current relative velocity between the transmitter and the receiver. For example, the receiver may perform filtering and/or other operations according to parameters whose optimal values may change according to the relative velocity. Even in a case where Doppler spreading is taken into account, the values assigned to these parameters may be based on statistical models that correspond to one or more fixed velocities. While this approach may yield good results when the actual relative velocity is close to a modeled velocity, it may not yield acceptable results when the relative velocity is far from a modeled velocity.

Expression (1) above describes the relation between Doppler spreading bandwidth and relative velocity. As described herein, methods and apparatus for bandwidth estimation according to certain embodiments of the invention may be applied to support better receiver performance in situations where Doppler spreading may occur. Once a bandwidth estimate is obtained, for example, demodulator performance may be improved in a system for mobile wireless communications (such as a system for cellular telephony) by tuning parameters such as filter coefficients to the corresponding velocity. In a particular example, demodulator performance may be improved in a CDMA system by tuning the coefficients of a pilot filter to correspond to the current relative velocity. Additional applications for bandwidth estimation as performed by methods and apparatus according to embodiments of the invention are also possible: for example, to modify the passband of a filter to include more signal energy and/or to exclude more noise energy.

It is possible to estimate signal bandwidth by obtaining a spectrum of the received signal and determining the frequency at which signal power drops below a predetermined threshold. A spectrum of a sampled received signal may be obtained by applying an N-point discrete Fourier transform (DFT) to a string of N consecutive samples:

$$X_k = \sum_{k=1}^{N-1} p_n e^{\frac{-j2\pi kn}{N}}, k \in \{0, 1, 2, \ldots, N\} \qquad (2)$$

where $p_n$ denotes the samples of the received signal and $X_k$ denotes the signal power at the discrete frequency k.

Figure 1:
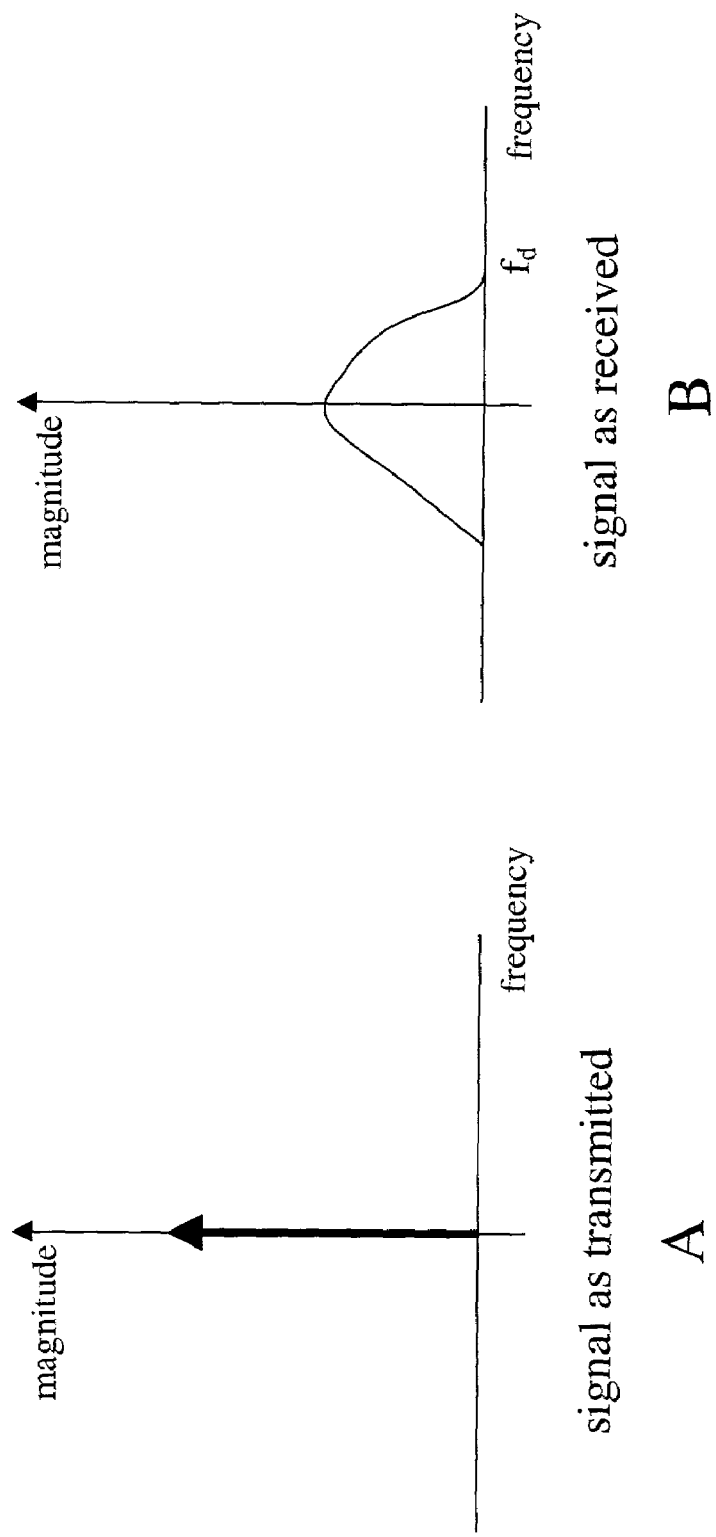
FIG. 1 is a diagram showing magnitude spectra of a signal as transmitted and as received.
Figure 2:
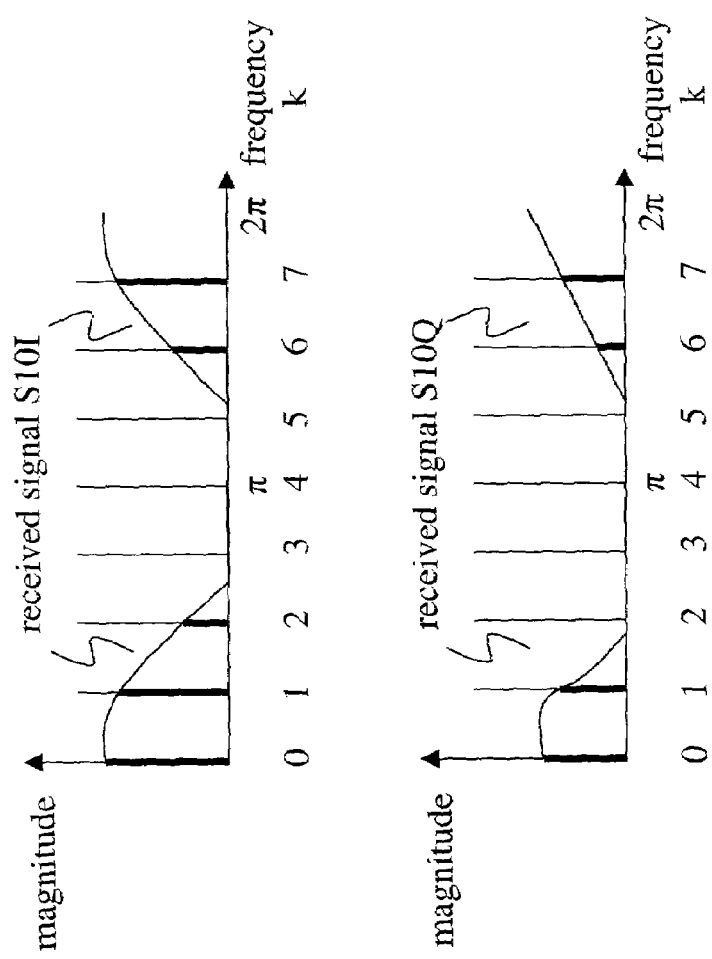
FIG. 2 is a diagram showing a magnitude spectrum of a signal as received and the frequency sampling points of an eight-point discrete Fourier transform.

FIG. 2 illustrates the spectrum of a received signal as obtained by applying an 8-point DFT (i.e. N=8) to the signal (as sampled at a sampling frequency $f_s$). In this case, the spectrum is presented as a magnitude spectrum for each of the two components (I and Q) of the complex received signal S10. Note that the spectrum of this illustration is derived from only eight samples, with a resulting resolution in frequency of only $f_s/8$. To obtain meaningful results for a practical application, a much greater sample set and/or a much more narrow resolution may be required, with correspondingly larger computational demands. For a sampling rate of 4800 samples/second, a 300-point DFT would be required to achieve a resolution of 16 Hertz (corresponding to, for example, approximately five miles per hour at a carrier frequency of 1 GHz). Although fast Fourier transform (FFT) techniques may be used to efficiently calculate a $2^x$-point DFT (for positive integer x), this computationally intensive task would still require a large amount of processing capacity for sizable values of $2^x$. Such a method may be impractical for real-time portable applications such as mobile wireless communications.

Rather than a spectrum that is uniformly sampled in frequency as produced by a DFT or FFT, it may be desirable to obtain a spectrum of a received signal that is nonuniformly sampled in frequency. For example, the bandwidth of the received signal may be known to some extent (e.g. from recent observations), and it may only be necessary to consider the received signal power at frequencies within a relatively narrow window. Narrowing of the search domain (e.g. through application of such information) may considerably reduce the amount of computation required for practical bandwidth estimation.

In a method according to one embodiment of the invention, the calculation of expression (2) above is performed only for m selected values of frequency k, where m is substantially less than N. In other words, the received signal is filtered with m filters, each centered about a frequency k and having an output $H_k$ defined as follows:

$$H_k = \sum_{n=0}^{N-1} p_n e^{\frac{-j2\pi kn}{N}}, k \in \{0, 1, 2, \ldots, N\}. \qquad (3)$$

Figure 3:
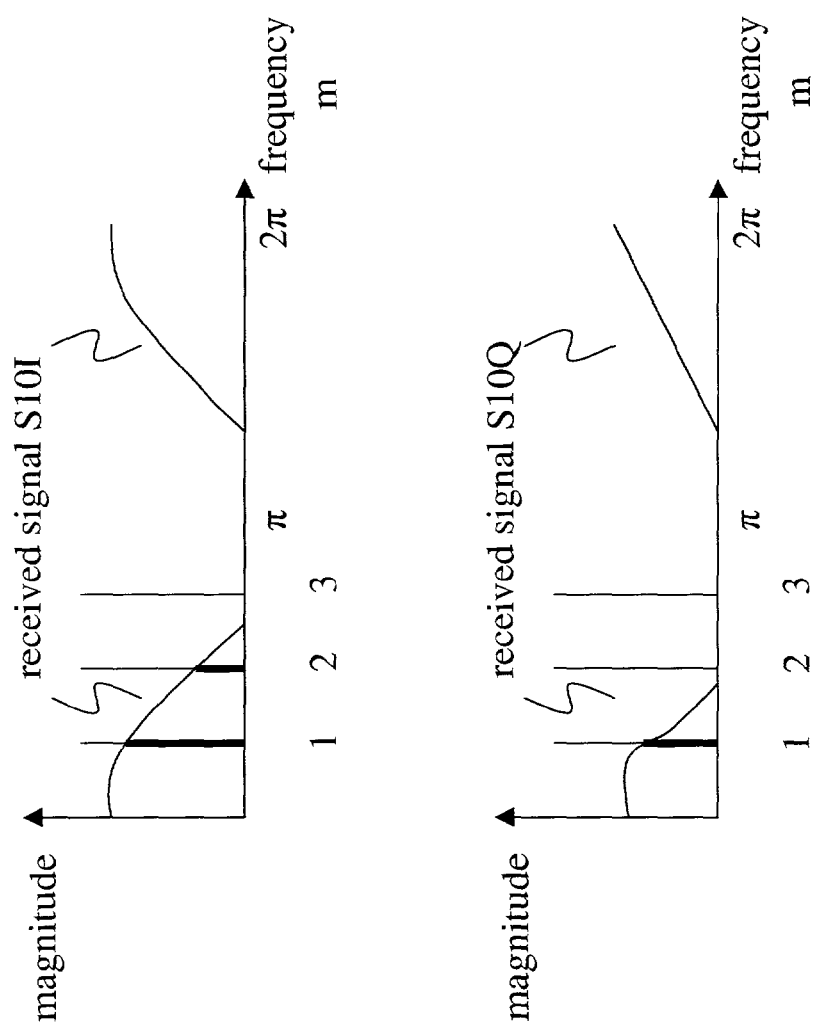
FIG. 3 is a diagram showing an application of a method according to an embodiment of the invention.

In an exemplary application where $f_s$=4800 Hertz and N=4800, a value of m=4 may provide good results, although the scope of the invention includes any ratio of $f_s$ to N and any value of m that provides a computational advantage over computing the entire N-point DFT using a FFT technique. The m selected frequencies may be consecutive (as illustrated in FIG. 3 for m=3 and N=8) and/or separated from one another. For example, it may be desirable to choose at least one frequency to be outside the expected bandwidth of the signal (e.g. at frequency π) in order to provide an estimate of the background noise power. It may be desired to select the m frequencies on only one side of the spectrum (as shown in FIG. 3) or on both sides (e.g. to estimate both bounds of an asymmetrical bandwidth).

In some cases, bandwidth estimates from only one multipath signal may be sufficient to support determination of a Doppler frequency that is applicable to multiple code channels and/or to signals arriving over different paths. In a method according to a further embodiment of the invention, improved performance may be achieved by combining bandwidth estimates from signals arriving over different paths and/or carrier frequencies.

While FFT techniques may be used to efficiently calculate an entire N-point spectrum, they are not generally applicable to calculation of m filter outputs $H_k$ as described above. Because of the unavailability of these optimizations, calculation of these filter outputs may be computationally expensive. In a method according to another implementation of the invention, the computational complexity of the filters is reduced. We rewrite expression (3) above as $$H_k = \sum_{n=0}^{N-1} p_n e^{-j\Delta_k n}, \qquad (4)$$

where the constant term $\Delta_k$ denotes $2\pi k/N$. Each coefficient of this finite-impulse-response filter is a phase vector with unit magnitude and a phase angle of $-(2\pi k/N)$. Note that we may expand expression (4) as follows:

$$H_k = p_0 + p_1 e^{-j\Delta_k} + p_2 e^{-j2\Delta_k} + p_3 e^{-j3\Delta_k} + p_4 e^{-j4\Delta_k} + \ldots$$

or $$Hk = p_0 + p_1 e^{-j\Delta_k} + p_2(e^{-j\Delta_k})e^{-j\Delta_k} + p_3(e-j2\Delta^k)e - j\Delta^k + p_4(e-j3\Delta^k)e - j\Delta^k + \ldots$$

These expansions demonstrate that each successive coefficient is the product of the previous coefficient and a generating value $e^{-j\Delta}$. We may rewrite expression (4) in an iterative form as $$H_k = p_0 + \sum_{n=1}^{N-1} p_n e^{-j\Delta_k} e^{-j\Delta_k(n-1)}. \qquad (5)$$

We define the accumulating value $e^{-j\Delta(n-1)}$ as the column matrix $$\begin{bmatrix} \cos(\Delta(n-1)) \\ -\sin(\Delta(n-1)) \end{bmatrix}$$

and the generating value $e^{-j\Delta}$ as the 2×2 rotation matrix $$\begin{bmatrix} \cos(\Delta) & \sin(\Delta) \\ -\sin(\Delta) & \cos(\Delta) \end{bmatrix}.$$

The resulting matrix operation may be performed without the calculation of any exponential functions. By precalculating and storing only the values $\sin(\Delta_k)$ and $\cos(\Delta_k)$ for each selected value of k, we may obtain each successive term of expression (4) from the previous term at runtime by performing only five complex multiplications (four for the rotation and one for the sample factor $p_n$) and two complex additions. As the run-time calculation of exponential functions may therefore be eliminated, the computational complexity of calculating the filter outputs $H_k$ may be greatly reduced.

Figure 4:
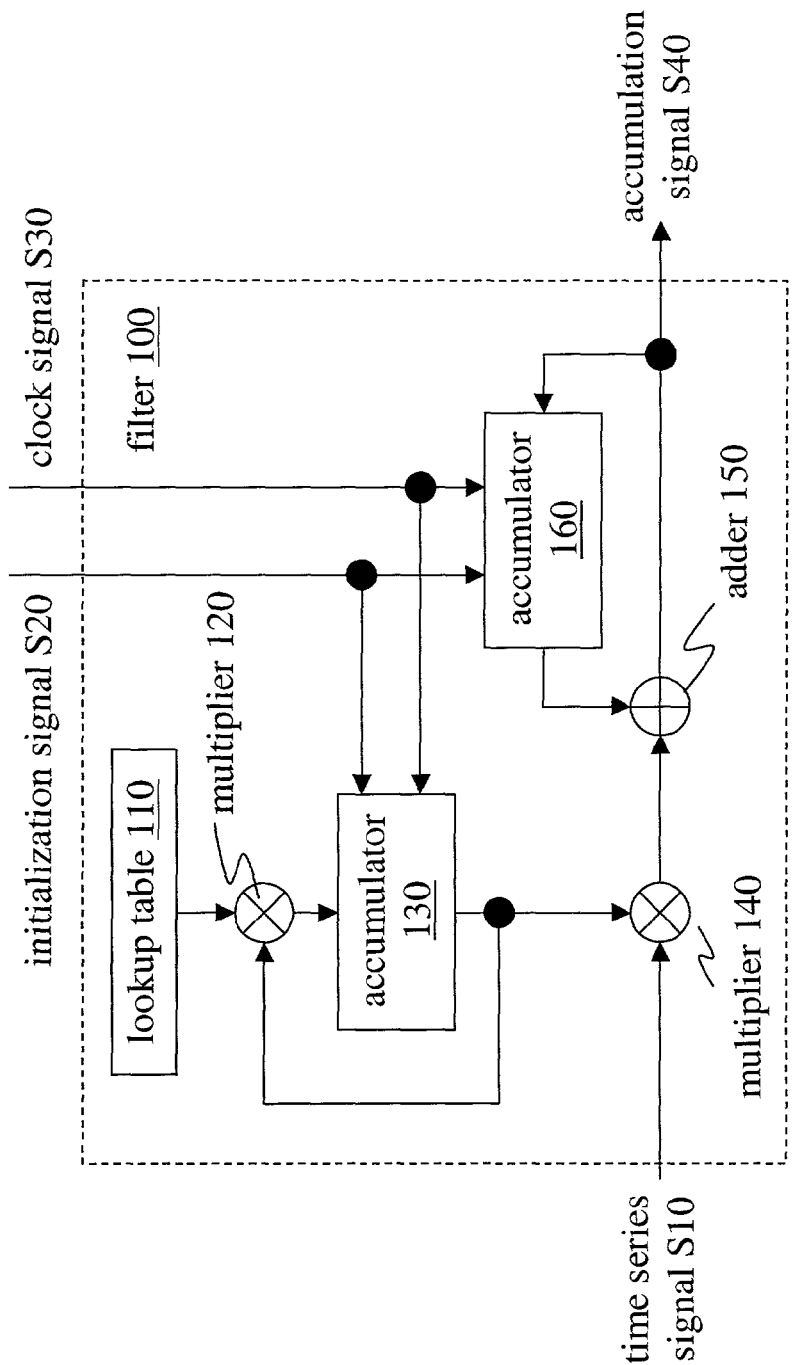
FIG. 4 is a block diagram of a filter 100 according to an embodiment of the invention.
Figure 5:
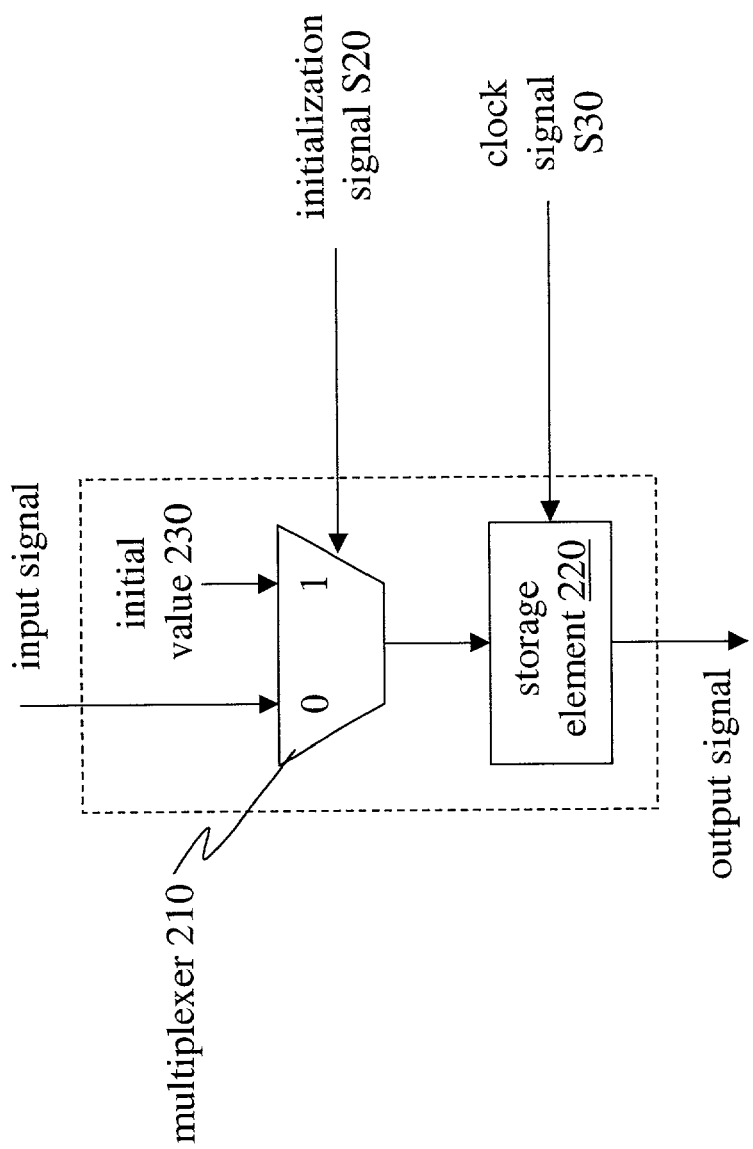
FIG. 5 is a block diagram of a structure suitable for accumulator 130 and/or 160 of filter 100.

FIG. 4 shows a block diagram of a filter 100 according to an embodiment of the invention. In response to a specified value or transition of initialization signal S20, accumulator 130 is initialized to store a value of one and accumulator 160 is initialized to store a value of zero. In response to a specified value or transition of clock signal S30, accumulators 130 and 160 latch the values present on their input signals. FIG. 5 shows a block diagram of one structure suitable for accumulator 130 and/or 160, including a multiplexer 210, a latching storage element 220, and an initial value 230 which may be hardwired or supplied by an external process or device. Many other suitable structures for accumulators 130 and 160 are possible.

Lookup table 110 stores the values $\sin(\Delta_k)$ and $\cos(\Delta_k)$ and outputs the pair of values corresponding to a selected k (e.g. as directed by a processor (not shown)) to a multiplier 120. Clock signal S30 is synchronized with the arrival of each sample value on time series signal S10. During the first clock period, multiplier 140 and adder 150 pass the sample value $p_0$ unchanged, and accumulators 130 and 160 store the values $e^{-j\Delta_k}$ and $p_0$, respectively. During the next clock period, multiplier 140 receives the values $p_1$ and $e^{-j\Delta_k}$ and outputs their product, adder 150 adds this product to the value $p_0$, accumulator 130 stores the value $e^{-j2\Delta_k}$, and accumulator 160 stores the value $(p_0 + p_1 e^{-j\Delta_k})$.

Figure 6:
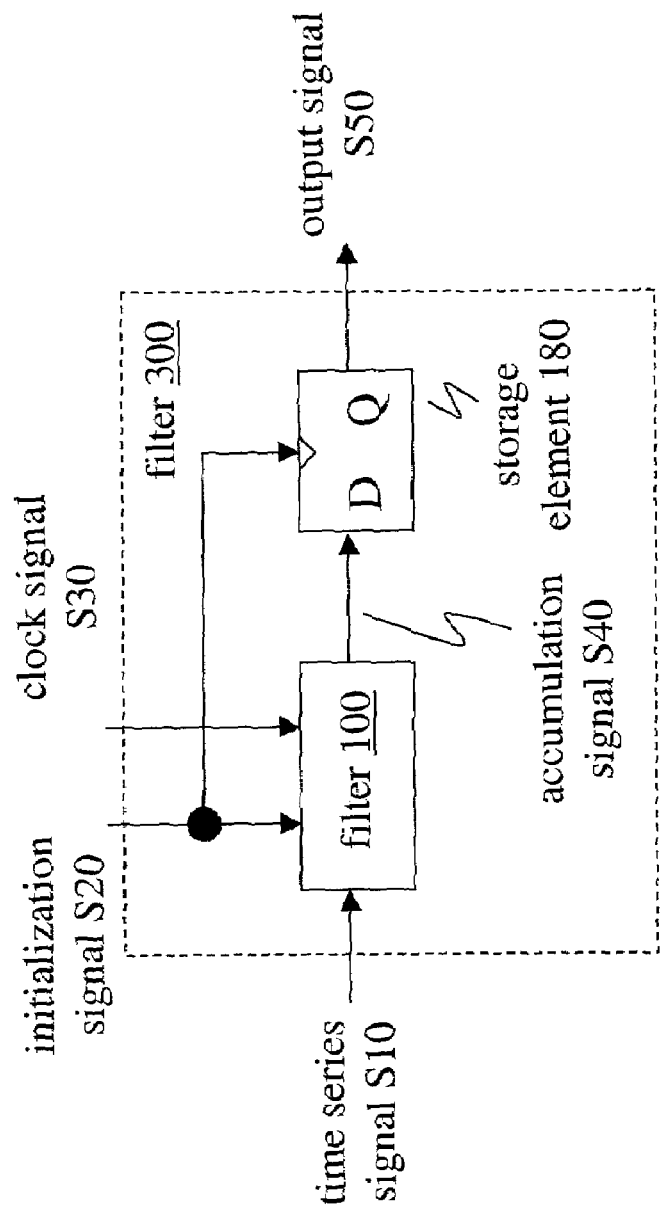
FIG. 6 is a block diagram of a further implementation 300 of a filter 100 according to an embodiment of the invention.

When the (N−1) summations have been calculated and accumulated, accumulation signal S40 carries the filter output value $H_k$ and initialization signal S20 is activated to initialize the accumulators. FIG. 6 shows a filter 200 that includes a latching storage element 180 that latches the filter output value $H_k$ in response to activation of initialization signal S20. It is understood that although storage element 180 is illustrated as a flip-flop, any other latching storage element or combination of such elements may be used, and the value stored by storage element 180 may have an arbitrary number of bits.

It is possible to calculate the power of the signal at each of the m selected frequencies by calculating the magnitude of the complex values $H_k$. Expression (6) below shows one method of calculating the power of the received signal from the filter response by squaring the absolute value of the filter response:

$$P_k = |H_k|^2. \qquad (6)$$

Figure 7:
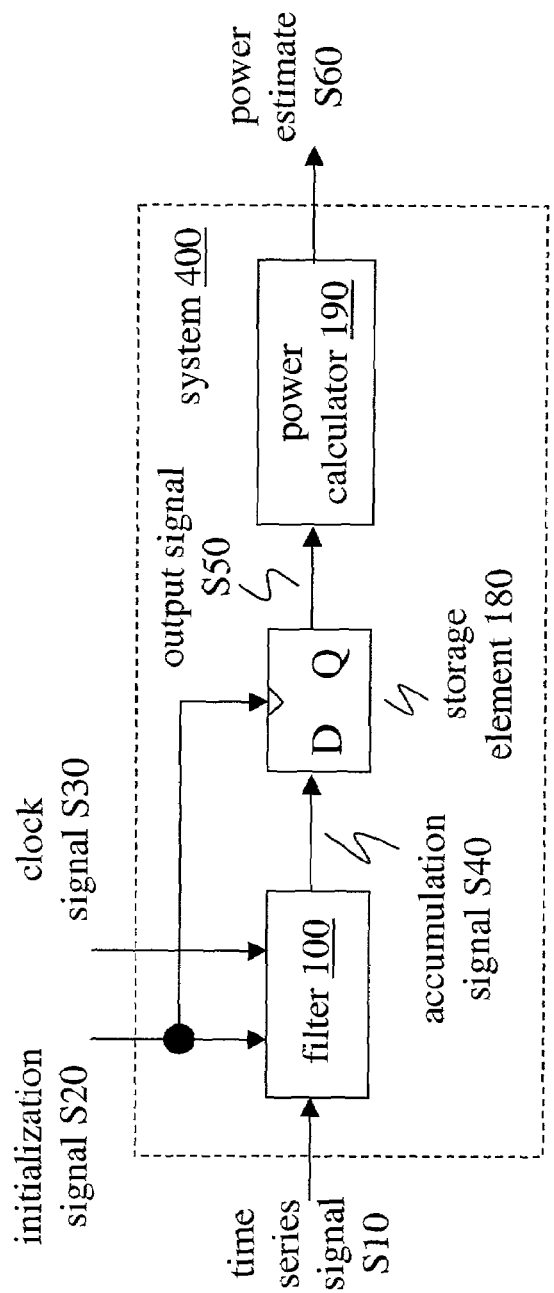
FIG. 7 is a block diagram of a system 400 according to an embodiment of the invention.

FIG. 7 shows a system 400 that includes a power calculator 490 that performs the calculation of expression (6) to output a power measure S60 having the value $P_k$. In order to produce the m output values, apparatus as described herein may be operated serially using different values of k and/or multiple implementations of such apparatus may be operated in parallel.

Various techniques may be used to obtain a bandwidth estimate from the signal power values $P_k$. In an absolute technique, the power values are compared to one or more predetermined thresholds. One such operation is to identify the frequency k or frequency interval k−(k+1) at which the power drops below a predetermined threshold. However, the spectrum of the received signal from frequency 0 to frequency π may not be a monotonically decreasing function, and this method may give an erroneous result in a case where a null or fade occurs in the spreading spectrum. Another such operation is to identify the greatest frequency k at which the power exceeds a predetermined threshold.

In a relative technique, relations among two or more power values are compared to one or more predetermined thresholds. In one such operation, threshold values T1 and T2 are defined, and the Doppler spreading frequency $f_d$ is determined to be a frequency k at which the following expression holds:

$$\frac{P_k}{P_{k+1}} > T1 \text{ AND } \frac{P_{k+1}}{P_{k+2}} > T2. \qquad (7)$$

Many other methods of determining the Doppler frequency of the received signal from the power values are possible.

Once the Doppler frequency $f_d$ has been estimated, the relative velocity may be estimated by applying expression (1) above. As noted herein, the receiver may then apply appropriate modifications to velocity-dependent parameters in order to increase the performance of the receiver. For cases in which only one or only a few carrier frequencies $f_c$ are used, it may be convenient to store the conversion of $f_d$ to relative velocity v in a lookup table.

Figure 8:
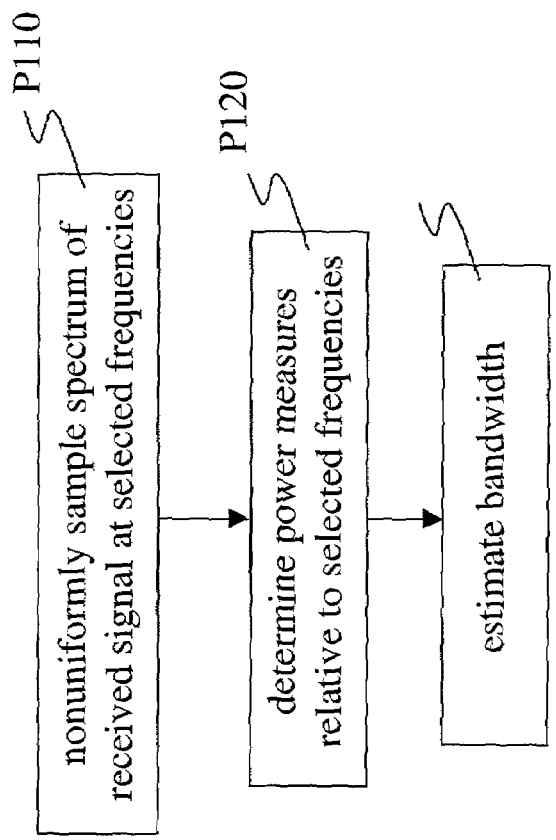
FIG. 8 is a flowchart of a method according to an embodiment of the invention.

FIG. 8 shows a flowchart of a method according to an embodiment of the invention. Task P110 nonuniformly samples a spectrum of a received signal at selected frequencies. Task P120 determines power measures of the received signal relative to the selected frequencies. Task P130 estimates a bandwidth of the received signal based on the power measures.

Figure 9:
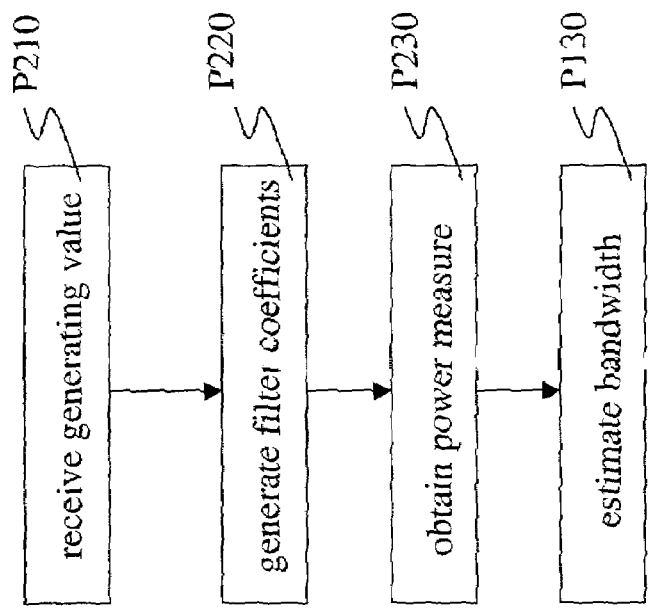
FIG. 9 is a flowchart of a method according to another embodiment of the invention.

FIG. 9 shows a flowchart of a method according to another embodiment of the invention. Task P210 receives a generating value. Task P220 generates filter coefficients from the generating value. Task P230 obtains a power measure of a received signal with respect to a selected frequency (which frequency may be established by the generating value). Task P130 estimates a bandwidth of the received signal based on the power measures.

Figure 10A:
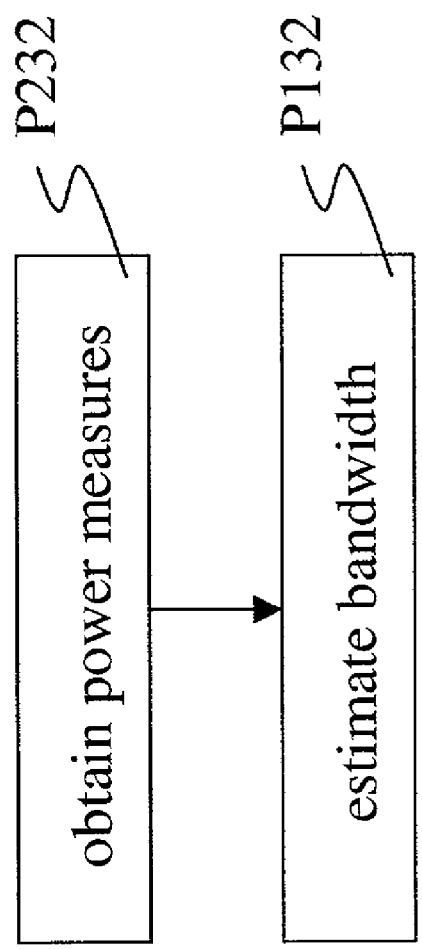
FIGS. 10A and 10B are flowcharts of a method according to another embodiment of the invention.
Figure 10B:
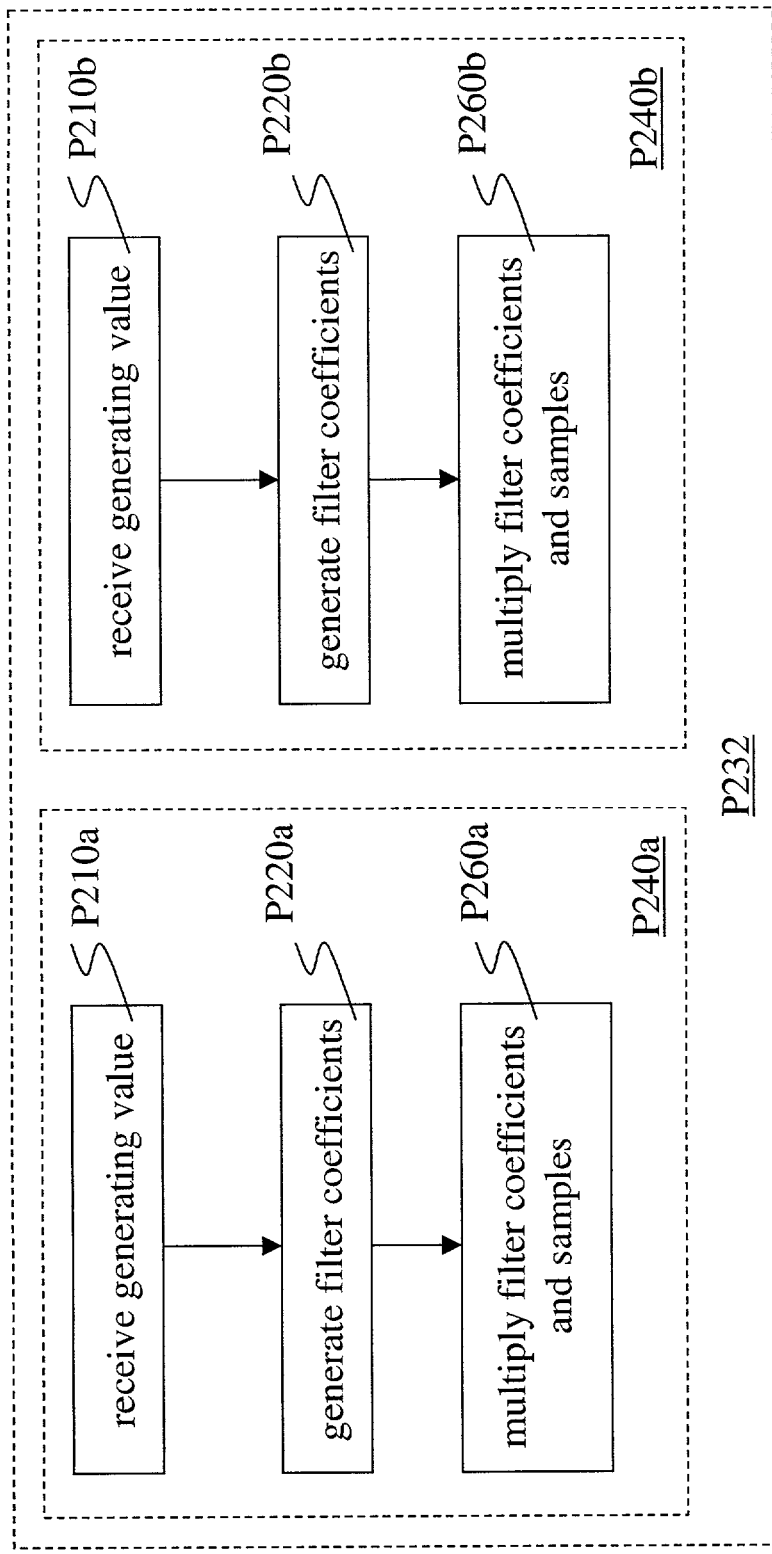
Figure 11:
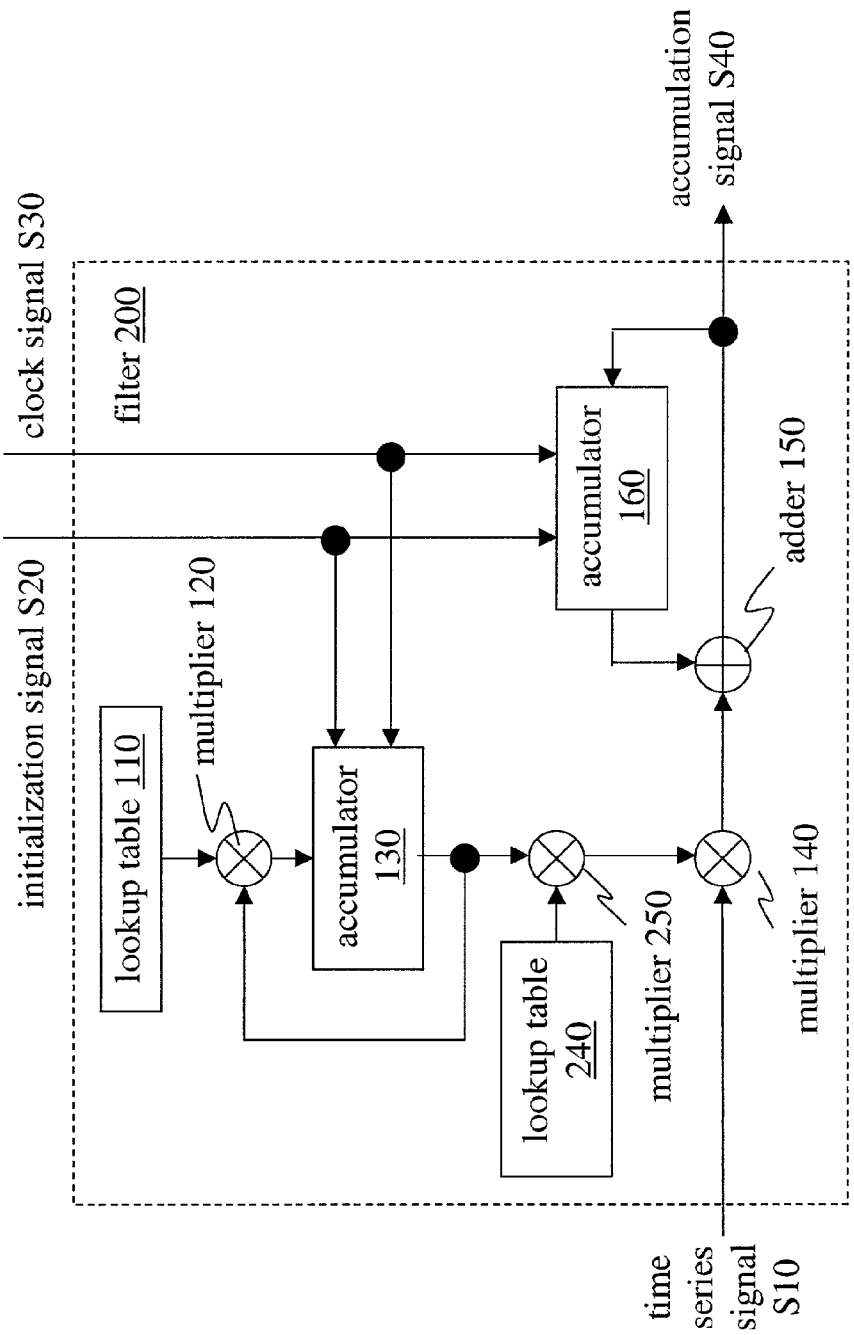
FIG. 11 is a block diagram of a further implementation 200 of a filter 100 according to an embodiment of the invention.
Figure 12:
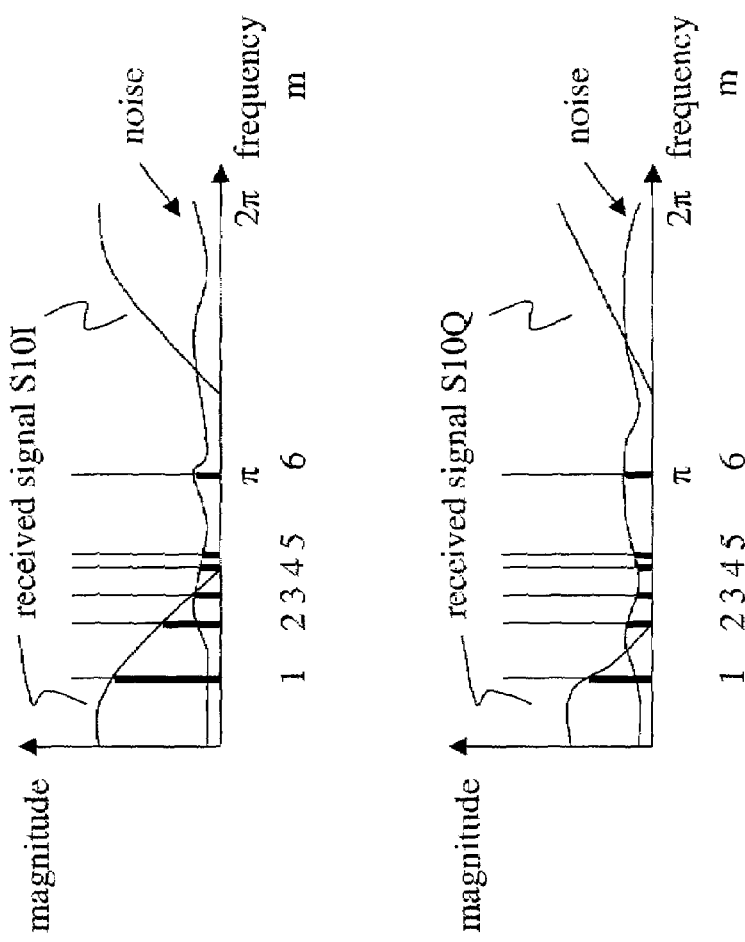
FIG. 12 is a diagram showing an application of a method according to an embodiment of the invention.

FIGS. 10A and 10B show flowcharts of a method according to another embodiment of the invention. Task P232 obtains power measures of a received signal, each power measure corresponding to a selected frequency. Task P132 estimates a bandwidth of the received signal based on the power measures. As shown in FIG. 10B, task P232 may include an arbitrary number of subtasks P240$i$, each including a task P210$i$ that receives a generating value, a task P220$i$ that generates filter coefficients from the generating value, and a task P260$i$ that multiplies each of the filter coefficients with a corresponding sample of the received signal.

In a method according to a further embodiment of the invention, one or more windowing functions are applied to modify one or more of the m filters. In a particular example, a rectangular window of width L<N is applied to each of the m filters, resulting in filters whose output values $G_k$ are described by the following expression:

$$G_k = p_0 + \sum_{n=1}^{L-1} p_n e^{-j\Delta_k} e^{-j\Delta_k(n-1)}, \Delta = \frac{2\pi k}{N}, k \in \{0, 1, 2, \ldots, N\}. \quad (8)$$

This particular windowing function results in a substitution of L for N in the summation index, further reducing the computational complexity of the filter and also reducing the size of the sample set required to obtain each filter output value from N to L. For an exemplary implementation in which N=4800, L may have a value in the neighborhood of N/2 or N/4. Computational advantages may be gained in particular applications by choosing L to be an integer power of two.

Another effect of the substitution in expression (8) is to change the width W of the main lobe of the filter's frequency response, as W is inversely proportional to L:

$$W = \frac{2f_s}{L}. \quad (9)$$

This expression demonstrates that as L decreases, the width of the main lobe of the filter's response increases. It may be desirable to use more than one value of L among the m filters, although it should be noted that the resulting difference in the filters' frequency responses may have the effect of making their outputs not strictly comparable (although compensation before comparison is possible).

In another method according to an embodiment of the invention, bandwidth estimation is performed in more than one stage, with different values of L, k, and/or m being used for the filters at each stage. In one two-stage example, a larger value of L, a smaller value of m, and more closely spaced values of k is used at the second stage, the values of k being selected within a narrow window of interest as indicated by the outputs of the filters of the first stage.

Each of the coefficients of the filters described in expressions (5) and (8) has a unit magnitude. Other windowing functions may be applied that remove this property (e.g. triangular, Hanning, Hamming). FIG. 8 shows a block diagram of an implementation 200 of filter 100 that includes a lookup table 240 configured to store the coefficients of the windowing function and a multiplier 250 to scale the filter coefficients accordingly.

It may be desirable to choose a windowing function having coefficients that are positive or negative powers of two so that multiplier 250 may be implemented as a shifter for more rapid calculation. For example, a filter's frequency response may be modified by multiplying the terminal (i.e. first and last) and/or near-terminal coefficients by ½, ¼, etc.

As the value of L in expression (8) increases, more quantization error may accumulate into the result. For a particular application, this effect may limit the maximum value of L even if additional computational capacity is available. As noted above and as illustrated in FIG. 9, it may also be desirable to use one or more out-of-band filters (e.g. filter 6 in FIG. 9 at frequency π) to quantify the noise within the communications system. The power value from the noise filter(s) may be subtracted from the power values from the other filters and/or used to modify the threshold value(s) before estimation of $f_d$.

In CDMA and other systems, a pilot signal may be used to support coherent demodulation (e.g. of phase-shift-keying modulated signals). In an exemplary application of a method or apparatus according to an embodiment of the invention, the bandwidth of a pilot filter is modified according to the estimated bandwidth of the pilot signal. Such an operation may improve the quality of the resulting phase reference and improve demodulator performance.

In certain applications of a method according to an embodiment of the invention, it may be possible to perform preprocessing operations on the received signal before bandwidth estimation. In one example, a receiver includes an automatic gain control (AGC) circuit. Applying an AGC operation may reduce the required dynamic range of subsequent operations, such as analog-to-digital conversion. Once the received signal passes through the AGC circuit, however, its envelope may become relatively constant, and much of the attenuation information caused by the fading channel may be lost. As the bandwidth of the signal remains unchanged, however (especially for a signal transmitted with constant power and phase at least over a specified time interval, such as a pilot signal of a CDMA system), it may be possible to perform such a preprocessing operation upstream of a method or apparatus according to an embodiment of the invention.

The foregoing presentation of the described embodiments is provided to enable any person skilled in the art to make, use, or apply a method or apparatus for bandwidth estimation. Various modifications to the described embodiments are possible, and the principles presented herein may be applied to other embodiments as well. For example, a method or apparatus according to an embodiment of the invention may also be extended to perform bandwidth estimation by noncoherently integrating frequency measurements acquired from more than one coherent sample set. A method or apparatus according to an embodiment of the invention may also be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

A method or apparatus according to an embodiment of the invention may be used within a mobile receiver and/or a stationary receiver. Such a method or apparatus may be applied to a pilot signal to obtain a better phase reference signal for demodulation and/or to a data signal to reduce interference. Various other noise characterization techniques may also be incorporated within such a method or apparatus to compensate for the out-of-band noise during bandwidth estimation. Although quantization noise may accumulate for large values of L as mentioned above, it may also be desirable to use reduced-bit-width storage or calculation in performing certain operations within implementations of a method or apparatus according to an embodiment of the invention. It is also within the scope of the invention to apply the principles set forth herein to transforms other than the discrete Fourier transform, such as the discrete cosine transform. Thus, the present invention is not intended to be limited to the embodiments shown above but rather is to be accorded the widest scope consistent with the principles and novel features disclosed in any fashion herein.

What is claimed is:

1. A method of bandwidth estimation comprising:
   receiving information defining a generating value of a filter;
   generating a plurality of coefficients of the filter from the generating value, the generating each of at least a subset of the plurality of coefficients includes rotating another of the plurality of coefficients by the generating value, each of at least a subset of the plurality of coefficients is generated from the previously generated coefficient; and
   obtaining a magnitude of an output of the filter to obtain a power measure of a received signal with respect to a selected frequency, said obtaining including multiplying each of the plurality of coefficients of the filter with a corresponding sample of the received signal; and
   estimating a bandwidth of the received signal based on the power measure.

2. A method of bandwidth estimation comprising:
   receiving information defining a generating of value of a filter;
   generating a plurality of coefficients of the filter from the generating value, each of at least a subset of the plurality of coefficients being generated from the previously generated coefficient;
   obtaining a magnitude of an output of the filter to obtain a power measure of a received signal with respect to a selected frequency, said obtaining including multiplying each of the plurality of coefficients of the filter with a corresponding sample of the received signal; and
   estimating a bandwidth of the received signal based on the power measure.

3. A method of bandwidth estimation comprising:
   receiving information defining a generating value of a filter;
   generating a plurality of coefficients of the filter from the generating value, the generating value including, a phase vector of unit magnitude;
   obtaining a magnitude of an output of the filter to obtain a power measure of a received signal with respect to a selected frequency, said obtaining including multiplying each of the plurality of coefficients of the filter with a corresponding sample of the received signal; and
   estimating a bandwidth of the received signal based on the power measure.

4. A method of bandwidth estimation comprising:
   receiving information defining a generating value of a filter;
   generating a plurality of coefficients of the filter from the generating value, the generating value includes a vector having a phase angle of magnitude ($2\pi k/N$) radians, where k is the selected frequency, and
   wherein the number of filter coefficients L is at most equal to $N/2$;
   obtaining a magnitude of an output of the filter to obtain a power measure of a received signal with respect to a selected frequency, said obtaining including multiplying each of the plurality of coefficients of the filter with a corresponding sample of the received signal; and
   estimating a bandwidth of the received signal based on the power measure.

5. The method of bandwidth estimation according to claim 4, wherein N is greater than one thousand, and
   wherein the number of selected frequencies is at most equal to one hundred twenty-eight.

6. A method of bandwidth estimation comprising:
   receiving information defining a generating value of a filter;
   generating a plurality of coefficients of the filter from the generating value, the generating each of at least a subset of the plurality of coefficients includes rotating another of the plurality of coefficients by the generating value;
   obtaining a magnitude of an output of the filter to obtain a power measure of a received signal with respect to a selected frequency,said obtaining multiplying each of the plurality of coefficients of the filter with a corresponding sample of the received signal; and
   estimating a bandwidth of the received signal based on the power measure, the estimating a bandwidth of the received signal includes comparing the power measure to a predetermined threshold.

7. A method of bandwidth estimation comprising:
   receiving information defining a generating value of a filter;
   generating a plurality of coefficients of the filter from the generating value, the generating each of at least a subset of the plurality of coefficients includes rotating another of the plurality of coefficients by the generating value;
   obtaining a magnitude of an output of the filter to obtain a power measure of a received signal with respect to a selected frequency, said obtaining including multiplying each of the plurality of coefficients of the filter with a corresponding sample of the received signal;
   estimating a bandwidth of the received signal based on the power measure; and estimating a relative velocity between a transmitter and a receiver based on a result of said estimating a bandwidth of the received signal.

8. A method of bandwidth estimation comprising:
receiving information defining a generating value of a filter;
generating a plurality of coefficients of the filter from the generating value, the generating each of at least a subset of the plurality of coefficients includes rotating another of the plurality of coefficients by the generating value;
obtaining a magnitude of an output of the filter to obtain a power measure of a received signal with respect to a selected frequency, said obtaining including multiplying each of the plurality of coefficients of the filter with a corresponding sample of the received signal;
estimating a bandwidth of the received signal based on the power measure; and
estimating a speed of a mobile receiver based on a result of said estimating a bandwidth of the received signal.

9. A method of bandwidth estimation comprising:
receiving information defining a generating value of a filter;
generating a plurality of coefficients of the filter from the generating value, the generating each of at least a subset of the plurality of coefficients includes rotating another of the plurality of coefficients by the generating value;
obtaining a magnitude of an output of the filter to obtain a power measure of a received signal with respect to a selected frequency, said obtaining including multiplying each of the plurality of coefficients of the filter with a corresponding sample of the received signal;
estimating a bandwidth of the received signal based on the power measure; and
modifying a passband of a second filter according to a result of said estimating a bandwidth of the received signal.

10. A method of bandwidth estimation comprising:
obtaining a plurality of power measures of a received signal, each power measure corresponding to one of a plurality of selected frequencies; and
estimating a bandwidth of the received signal based on the power measures of the received signal,
wherein obtaining each of the plurality of power measures includes:
receiving information defining a generating value of a filter;
generating a plurality of coefficients of the filter from the generating value;
multiplying each of the coefficients of the filter with a corresponding sample of the received signal; and
comparing a relation between at least two of the power estimates to a predetermined threshold.

11. The method of bandwidth estimation according to claim 10, wherein at least one of the power measures corresponds to a selected frequency that is outside of an expected bandwidth of the received signal.

12. The method of bandwidth estimation according to claim 11, wherein said estimating a bandwidth of the received signal includes modifying at least a subset of the plurality of power measures based on the at least one power measure that corresponds to a selected frequency that is outside of an expected bandwidth of the received signal.

13. The method of bandwidth estimation according to claim 10, wherein said estimating a bandwidth of the received signal includes determining the greatest selected frequency for which the corresponding power estimate is greater than a predetermined threshold.

14. The method of bandwidth estimation according to claim 10, wherein said estimating a bandwidth of the received signal includes comparing a second relation between at least two of the power estimates to a predetermined second threshold.

15. The method of bandwidth estimation according to claim 10, wherein, for each of the plurality of power measures, generating each of at least a subset of the plurality of coefficients of the filters includes rotating another of the plurality of coefficients by the generating value.

16. The method of bandwidth estimation according to claim 15, wherein, for each of the plurality of power measures, each of at least a subset of the coefficients of the filter is generated from the previously generated coefficient.

17. The method of bandwidth estimation according to claim 10, wherein, for each of the plurality of power measures, each of at least a subset of the coefficients of the filter is generated from the previously generated coefficient.

18. The method of bandwidth estimation according to claim 10, wherein, for each of the plurality of power measures, the generating value defines a vector having a phase angle of magnitude $(2\pi k/N)$ radians, where k is the selected frequency, and
wherein the number of filter coefficients is at most equal to $N/2$.

19. The method of bandwidth estimation according to claim 18, wherein, for at least one of the plurality of power measures, N is greater than one thousand, and
wherein the number of selected frequencies is at most equal to one hundred twenty-eight.

20. A method of bandwidth estimation comprising:
calculating at least one coefficient of at least one of a plurality of filters from another coefficient of the filter;
nonuniformly sampling a frequency spectrum of a received signal at a plurality of selected frequencies by filtering the received signal with the plurality of filters, each filter being centered about one of the plurality of selected frequencies;
determining a plurality of power measures of the received signal, each power measure being relative to one of the plurality of selected frequencies; and
obtaining an estimate of the bandwidth of the received signal, said estimate based at least in part on the power measures of the received signal.

21. The method of bandwidth estimation according to claim 20, wherein, for at least one of the plurality of filters, at least a subset of the coefficients of the filter are based on a vector having a phase angle of magnitude $(2\pi k/N)$ radians, where k is the selected frequency, and
wherein the number of coefficients of the filter is at most equal to $N/2$.

22. The method of bandwidth estimation according to claim 21, wherein N is greater than one thousand, and
wherein the number of selected frequencies is at most equal to one hundred twenty-eight.

23. A filter comprising:
a lookup table configured and arranged to store a plurality of generating values;
a first multiplier configured and arranged to receive a selected one of the generating values and a current filter coefficient and to output a subsequent filter coefficient;
an accumulator configured and arranged to receive and store the subsequent filter coefficient;

a second multiplier configured and arranged to multiply the current filter coefficient with a corresponding one of a series of samples of a received signal and to output a current filtered value; and an adder configured and arranged to receive the current filtered value and a past filtered value and to output an accumulation signal.

24. The filter according to claim 23, wherein the accumulator is configured and arranged to store an initial value of one.

25. The filter according to claim 23, further comprising a storage element configured and arranged to store a value of the accumulation signal in response to a latching signal, wherein the latching signal has a predetermined time relation to the initialization signal.

26. The filter according to claim 23, further comprising a power calculator configured and arranged to output a power measure based on a value of the accumulation signal.

27. A system for bandwidth estimation comprising:

a lookup table configured and arranged to store a plurality of generating values;

a plurality of filters, each filter including a first multiplier configured and arranged to receive a selected one of the generating values and a current filter coefficient and to output a subsequent filter coefficient, an accumulator configured arranged to receive and store the subsequent filter coefficient, a second multiplier configured and arranged to multiply the current filter coefficient with a corresponding one of a series of samples of a received signal and to output a current filtered value, an adder configured and arranged to receive the current filtered value and a past filtered value and to output an accumulation signal, and a power calculator configured and arranged to output a power measure based on a value of the accumulation signal; and a bandwidth estimator configured and arranged to receive the power measures of the plurality of filters and to output an estimate of the bandwidth of the received signal.

28. The system for bandwidth estimation according to claim 27, wherein the bandwidth estimator is configured and arranged to compare a relation between at least two of the power measures to a predetermined threshold.

29. The system for bandwidth estimation according to claim 27, wherein at least one of the power measures corresponds to a frequency that is outside of an expected bandwidth of the received signal, and wherein the bandwidth estimator is configured and arranged to modify at least a subset of the power measures based on the at least one power measure that corresponds to a frequency that is outside of an expected bandwidth of the received signal.

30. The system for bandwidth estimation according to claim 27, further comprising a relative velocity estimator configured and arranged to output a relative velocity estimate based on the estimate of the bandwidth of the received signal.

* * * * *